US011927451B2

(12) United States Patent
Nakamura et al.

(10) Patent No.: US 11,927,451 B2
(45) Date of Patent: Mar. 12, 2024

(54) ROUTE SEARCH DEVICE AND NON-TRANSITORY COMPUTER-READABLE MEDIUM

(71) Applicant: Toyota Jidosha Kabushiki Kaisha, Toyota (JP)

(72) Inventors: Motohiro Nakamura, Okazaki (JP); Yoko Sakurai, Anjo (JP); Norihiro Nakamura, Anjo (JP); Hidefumi Okabe, Anjo (JP); Naoto Miura, Anjo (JP); Koichi Iwatsuki, Anjo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 203 days.

(21) Appl. No.: 16/591,052

(22) Filed: Oct. 2, 2019

(65) Prior Publication Data
US 2020/0109956 A1 Apr. 9, 2020

(30) Foreign Application Priority Data
Oct. 4, 2018 (JP) .................................. 2018-188825

(51) Int. Cl.
*G01C 21/34* (2006.01)
(52) U.S. Cl.
CPC ..... *G01C 21/3423* (2013.01); *G01C 21/3415* (2013.01); *G01C 21/3476* (2013.01); *G01C 21/3484* (2013.01)
(58) Field of Classification Search
CPC ............ G01C 21/3446; G01C 21/3484; G01C 21/3492; G01C 21/3423; G01C 21/3415; G01C 21/3476
See application file for complete search history.

(56) References Cited

U.S. PATENT DOCUMENTS

| 6,208,934 B1* | 3/2001 | Bechtolsheim .... G01C 21/3685 |
| | | 701/428 |
| 7,136,749 B2 | 11/2006 | Ichihara et al. |

(Continued)

FOREIGN PATENT DOCUMENTS

| JP | 2000-161978 A | 6/2000 |
| JP | 2007205946 A | 8/2007 |

(Continued)

OTHER PUBLICATIONS

Park Jin, Young et al., Service Providing Apparatus and Method for Supporting Creation of Route, 2016, SK Telecom Co LTD, KR20160092660A, Description (Year: 2016).*

(Continued)

*Primary Examiner* — Jess Whittington
(74) *Attorney, Agent, or Firm* — Dinsmore & Shohl LLP (57) ABSTRACT

Provided is a route search device and a non-transitory computer-readable medium that can search a route where a transportation means more suitable for a user is selected. When searching a route to a destination, a change point at which the transportation means is changed is set, and then the priority in selecting a transportation means for moving in a section from a plurality kinds of transportation means is set based on at least one of an attribute of a start point and an attribute of an end point in the section for each section where a distance between a departure place and a destination is divided at the change point to search the route to the destination using the transportation means selected for each of the plurality of sections based on the set priority.

7 Claims, 8 Drawing Sheets

(56) References Cited

U.S. PATENT DOCUMENTS

| | | | |
|---|---|---|---|
| 7,957,871 B1* | 6/2011 | Echeruo | G01C 21/3626 |
| | | | 340/995.13 |
| 9,696,168 B2* | 7/2017 | Shimazaki | G01C 21/3423 |
| 2004/0260466 A1 | 12/2004 | Ichihara et al. | |
| 2010/0268450 A1* | 10/2010 | Evanitsky | G01C 21/3423 |
| | | | 701/533 |
| 2015/0006072 A1* | 1/2015 | Goldberg | G06Q 50/30 |
| | | | 705/5 |
| 2018/0156623 A1* | 6/2018 | West | G01C 21/3484 |
| 2018/0211337 A1* | 7/2018 | Ghaddar et al. | G06Q 50/14 |
| 2019/0128682 A1* | 5/2019 | Hori | G01C 21/3423 |

FOREIGN PATENT DOCUMENTS

| | | | | |
|---|---|---|---|---|
| JP | 2008-157712 A | | 7/2008 | |
| JP | 2009-222393 A | | 10/2009 | |
| JP | 2009271019 A | | 11/2009 | |
| JP | 5092819 B2 | * | 12/2012 | G08G 1/0969 |
| JP | 5092819 B2 | | 12/2012 | |
| JP | 2016-211915 A | | 12/2016 | |
| KR | 20160092660 A | * | 8/2016 | G08G 1/005 |

OTHER PUBLICATIONS

Nomura; Toshio, Navigation Apparatus for Vehicle, Dec. 5, 2012, Denso Corp, JP5092819B2, Description (Year: 2012).*

Notice of Reasons for Refusal dated May 11, 2022 in Japanese counterpart application No. 2018-188825.

Notification of the First Office Action dated Jan. 19, 2023 for Chinese counterpart application No. 201910922400.0.

Second Office Action dated May 19, 2023 for Chinese Counterpart Application No. 201910922400.0.

Intelligent Transportation System: Principles, Methods and Applications, Edited by Yan Xinping, Wu Chaozhong, 2nd Edition, Wuhan University of Technology Press, Aug. 2014.

* cited by examiner

PRIORITY TABLE (WALKING)

| ATTRIBUTE(START POINT, END POINT) | PRIORITY OF WALKING |
|---|---|
| HOME→PARKING LOT | LOW |
| PARKING LOT→GETTING-ON STATION | MEDIUM |
| GETTING-ON STATION→GETTING-OFF | 0(Always select a train) |
| GETTING-OFF STATION→DESTINATION | HIGH |
| ... | ... |

FIG.4

PRIORITY TABLE (WALKING)

| ATTRIBUTE(START POINT) | PRIORITY OF WALKING |
|---|---|
| HOME | LOW |
| PARKING LOT | MEDIUM |
| GETTING-ON STATION | 0(Always select a train) |
| GETTING-OFF STATION | HIGH |
| ... | ... |

FIG.5

PRIORITY TABLE (WALKING)

| ATTRIBUTE(END POINT) | PRIORITY OF WALKING |
|---|---|
| PARKING LOT | LOW |
| GETTING-ON STATION | MEDIUM |
| GETTING-OFF STATION | 0(Always select a train) |
| DESTINATION | HIGH |
| ... | ... |

FIG.9

ROUTE SEARCH DEVICE AND NON-TRANSITORY COMPUTER-READABLE MEDIUM

CROSS-REFERENCE TO RELATED APPLICATIONS

This application is based upon and claims the benefit of priority of the prior Japanese Patent Application No. 2018-188825, filed on Oct. 4, 2018, the entire contents of which are incorporated herein by reference.

FIELD

The present disclosure relates to a route search device and a non-transitory computer-readable medium that searches a route to a destination.

BACKGROUND

Recently, a navigation device capable of performing a travel guidance for a vehicle to easily guide a driver to a desired destination is often mounted on a vehicle. The navigation device is defined as a device that can detect a current position of one's own vehicle with a GPS receiver etc. and display a map data corresponding to the current position on a liquid crystal monitor after obtaining the map data through a recording medium such as DVD-ROM and HDD or a network. Further, the above navigation device includes a route search function that searches an optimum route from a position of one's own vehicle to a destination when the desired destination is input, and surely guides the user to the desired destination by setting the searched optimum route as a guidance route, displaying the guidance route on a display screen, and performing a guidance by voice when approaching an intersection etc. Also, recently, there are cellular phones, smart phones, tablet devices, and personal computers that have the same function as the above navigation device. In addition, the users have searched not only a route for moving by vehicle but also a route for moving by an optimum transportation means selected from a plurality of transportation means (for example, walking, private automobiles, buses, and trains) for guidance.

When one transportation mean is selected from the plurality of transportation means, some users have set the priority in selecting the transportation means. For example, JP2009-222393A discloses that walking is preferentially selected as a transportation means, and a route for moving by walking is guided when a route length from a departure place to a destination is less than a prescribed distance or surroundings along the route is suitable for walking (for example, sunny weather, the outside temperature is within a prescribed range).

SUMMARY

Especially, when a route to a distant destination is searched, it may be better for the user not to select a route for moving by only one transportation means (for example, a private automobile) but to select a route for moving while changing the plurality kinds of transportation means (for example, walking, private automobiles, buses, and trains). When searching a route for moving while changing the plurality kinds of transportation means, it is necessary to appropriately select a transportation means suitable for the section for each section included in a route to the destination. When the transportation means suitable for the section included in the route to the destination is selected, it is important to consider each situation of a start point or an end point in the section, and the user had a risk that he/she cannot select an appropriate transportation means by a selection as described in the Patent Document 1 based on the route length and the surroundings along the route (for example, weather and outside temperature).

For example, since a section moving from an arrival station after getting off the train in a route to the destination is in a hard situation to select a private automobile, it is preferable to preferentially select walking rather than the private automobile as a transportation means regardless of the route length and the surroundings along the route.

The present disclosure is made in order to solve the conventional technical problems, and the object of the disclosure is to provide a route search device and a non-transitory computer-readable medium capable of searching a route where a transportation means more suitable for a user is selected by setting a priority of the transportation means based on at least one of an attribute of a start point and an attribute of an end point in a section for each section included in a route to the destination.

In order to accomplish the above object, according to one aspect of the present disclosure, it is provided a route search device comprising: priority setting means for setting a priority in selecting a transportation means used for moving in a section from a plurality of kinds of the transportation means for each section included in a route when searching a route to a destination; and route search means for searching the route to the destination using the transportation means selected for the each section based on the priority set by the priority setting means, wherein the priority setting means sets the priority of the corresponding transportation means based on at least one of an attribute of a start point and an attribute of an end point in the section for the each section included in the route.

The non-transitory computer-readable medium according to the present disclosure is a non-transitory computer-readable medium storing a program to search the route to the destination. Specifically, while a computer program makes a computer function as: priority setting means for setting a priority in selecting a transportation means used for moving in a section for each section included in a route from a plurality of kinds of the transportation means when searching a route to a destination; and route search means for searching the route to the destination using the transportation means selected for the each section based on the priority set by the priority setting means, the priority setting means sets the priority of corresponding transportation means based on at least one of an attribute of a start point and an attribute of an end point in the section for the each section included in the route.

According to the route search device and the non-transitory computer-readable medium related to the present disclosure including the above technical features, even when searching a route for moving while changing the plurality kinds of transportation means, it becomes possible to search a route where transportation means more suitable for a user are selected by setting the priority of the transportation means based on at least one of the attribute of the start point and the attribute of the end point in the section for the each section included in the route to the destination.

DESCRIPTION OF EMBODIMENTS

Figure 1:
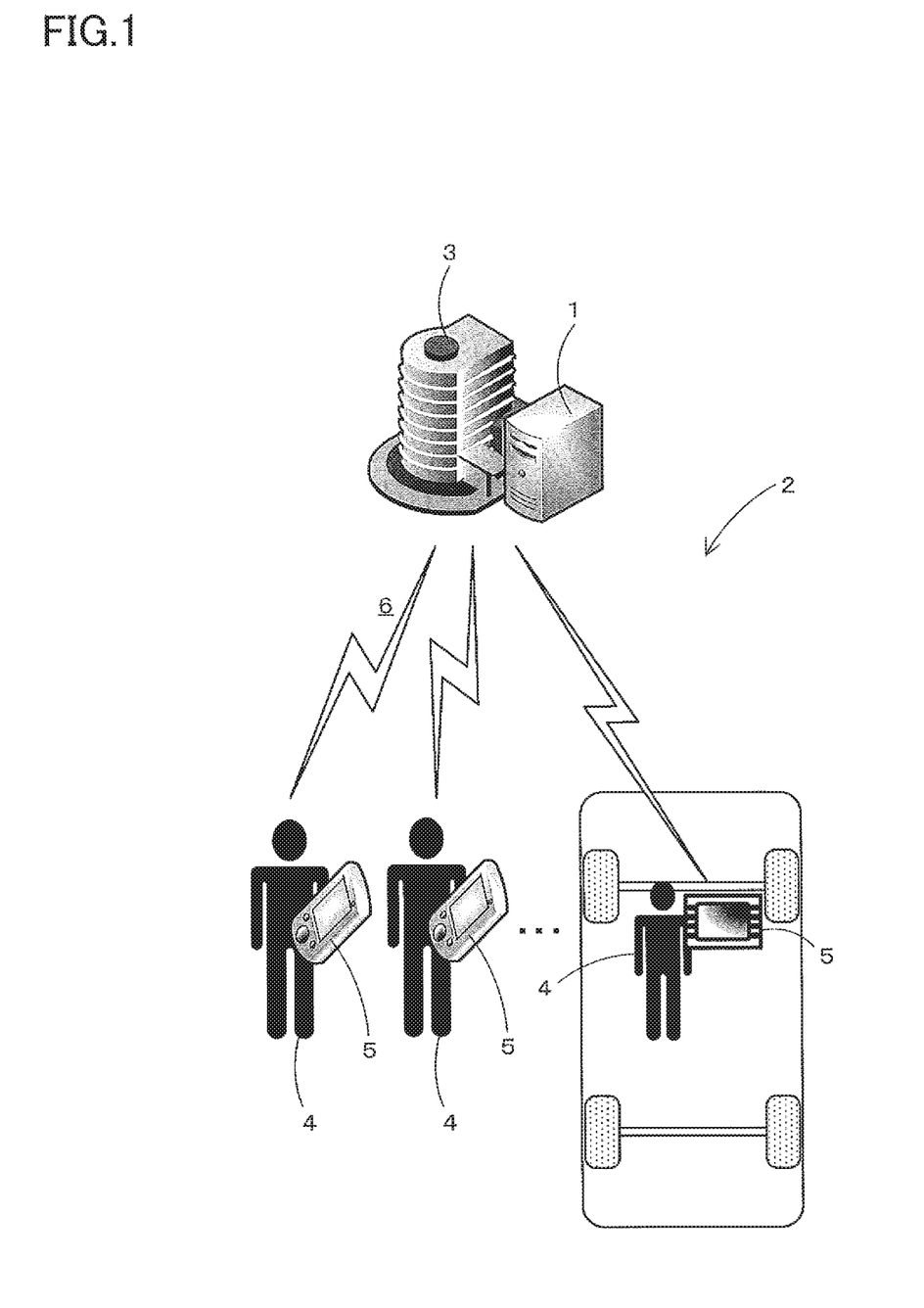
FIG. 1 is a schematic block diagram illustrating a route search system according to the present embodiment.
Figure 2:
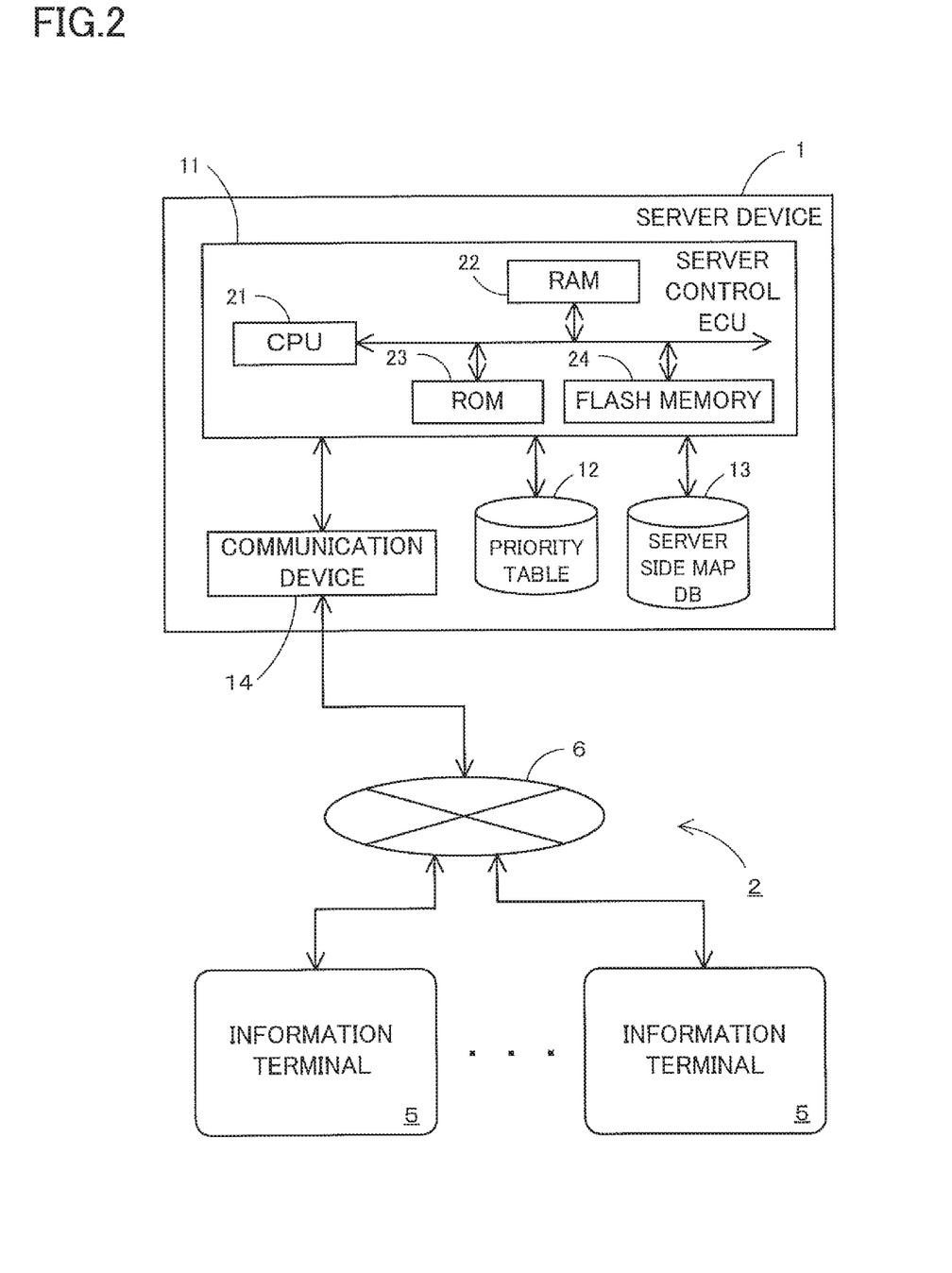
FIG. 2 is a block diagram illustrating a configuration of the route search system according to the present embodiment.

Hereinafter, a server device 1 according to one embodiment of a route search device of the present disclosure will be described in detail with reference to drawings. Firstly, a schematic configuration of a route search system 2 including the server device 1 according to the present embodiment will be described using FIGS. 1 and 2. FIG. 1 is a schematic block diagram illustrating the route search system 2 according to the present embodiment. FIG. 2 is a block diagram illustrating a configuration of the route search system 2 according to the present embodiment.

As illustrated in FIG. 1, the route search system 2 according to the present embodiment basically includes the server device 1 provided in an information distribution center 3 and an information terminal 5 carried by a user 4. The server device 1 and the information terminal 5 can mutually transmit/receive electronic data to/from via a communication network 6. Examples of the information terminal 5 includes cellular phones, smart phones, tablet devices, personal computers, and navigation device etc. The user 4 may stay in a vehicle, or the user may not stay in a vehicle.

The server device 1 executes a route search in response to a request of the information terminal 5. Specifically, when a destination is set in the information terminal 5 or the route is re-searched, the information terminal 5 transmits necessary information for the route search such as a departure place and the destination to the server device 1 (however, it is not always necessary to transmit information about the destination for the re-search). The server 1 which has received the route search request executes the route search using a map information included in the server device 1 and specifies a recommended route from the departure place to the destination. After that, the specified recommended route is transmitted to the information terminal 5 as a request source. The information terminal 5 sets the received recommended route to a guidance route, and guides to the destination in accordance with the guidance route. Thereby, even when the map information included in the information terminal 5 is older, or the information terminal 5 does not include the map information itself at the time of route search, an appropriate guidance route can be set based on the latest version of the map information included in the server device 1. Especially, in the present embodiment, when the route search from the departure place to the destination is executed, the recommended route is searched taking into consideration moving while changing the plurality kinds of transportation means such as walking, private automobiles, trains, buses, ships, and planes (multimodal).

However, the route search processing is not necessarily executed by the server device 1, and the information terminal 5 may execute the route search processing if the information terminal 5 includes the map information.

Meanwhile, the user 4 possesses the information terminal 5 including a navigation function, which corresponds to cellular phones, smart phones, tablet devices, and personal computers, and navigation devices etc.

The navigation functions include displaying route information specifying a route searched by the server device 1, displaying a map image around a current position of the user 4 based on the map data obtained from the server or stored in a memory, displaying the current position of the user 4 in a displayed map image, and guiding to the destination along the set guidance route. The information terminal 5 does not need to include all the navigation functions described above, and the present disclosure can be configured as long as the navigation functions include at least one function of displaying the route information.

The communication network 6 is configured to include a lot of base stations disposed nationwide and a communication company that manages and controls each of the base stations and mutually connect the base stations and the communication company by a wireless or wired channel (optical fiber, ISDN etc.). The base station includes a transceiver that communicates with the information terminal 5 and an antenna. While the base station performs a wireless communication with the communication company, the base station is served as a terminal of the communication network 6 and plays a role of relaying a communication of the information terminal 5 within an area (cell) which the base station can transmit radio waves between the information terminal 5 and the base station and the server device 1.

Next, the configuration of the server device 1 in the route search system 2 will be described in detail with reference to FIG. 2. The server device 1 includes a server control ECU11, a priority table 12 stored in an information recording means connected to the server control ECU11, a server side map DB13, and a server side communication device 14 as described in FIG. 2.

The server control ECU 11 (electronic control unit) is an electronic control unit that controls the whole server device 1, and includes a CPU 21 serving as an arithmetic device and a control device, a RAM 22 used as a working memory when the CPU 21 performs various arithmetic processings, and internal storages such as a ROM 23 in which a route search processing program (FIG. 7) described later is recorded and a flash memory 24 in which a program read out from the ROM 23 is stored as well as a program for control. The server control ECU 11 and an ECU of the information terminal 5 described later include various means as a processing algorithm. For example, a priority setting means sets a priority in selecting a transportation means used for moving in the section from the plurality of kinds of the transportation means for each section included in the route when searching the route to the destination. A route search means searches the route to the destination using a transportation means selected for the each section based on the priority set by the priority setting means.

The priority table 12 is a table used for setting the priority in selecting a transportation means from the plurality of kinds of the transportation means when the route search is executed by the server device 1. In the present embodiment, when a route search from a departure place to a destination is executed, a recommended route is searched taking into consideration moving while changing the plurality kinds of transportation means such as walking, private automobiles, trains, buses, ships, and planes (multimodal). When the multimodal search is executed by the server device 1, a change point at which the transportation means is changed is set, and then the priority is set with reference to the priority table 12 for the each section where a route from a departure place to a destination is divided at each change point. The examples of the change point include parking lots, train stations, bus stops, ports, and airports etc.

The priority table 12 is a table that sets the priority of the corresponding transportation means based on at least one of an attribute of a start point and an attribute of an end point in a section. For example, the "attribute" includes (A) a genre of a point corresponding to the start point and the end point (homes parking lots, departure places, destinations, getting-on stations, and boarding bus stops etc.); (B) type of facilities provided at the start point and the end point (for example, a facility provided with a parking lot); and (C) areas of the start point and the end point (for example, cities, wards, towns, and villages). In the present embodiment, the "attribute" is set to a genre of a point corresponding to the start point and the end point. Also, the priorities are set to, for example, four stages of "0 (not selected)", "low", "medium", and "high", and as the priority is higher, it is easy to be selected as a transportation means in the section.

Figure 3:
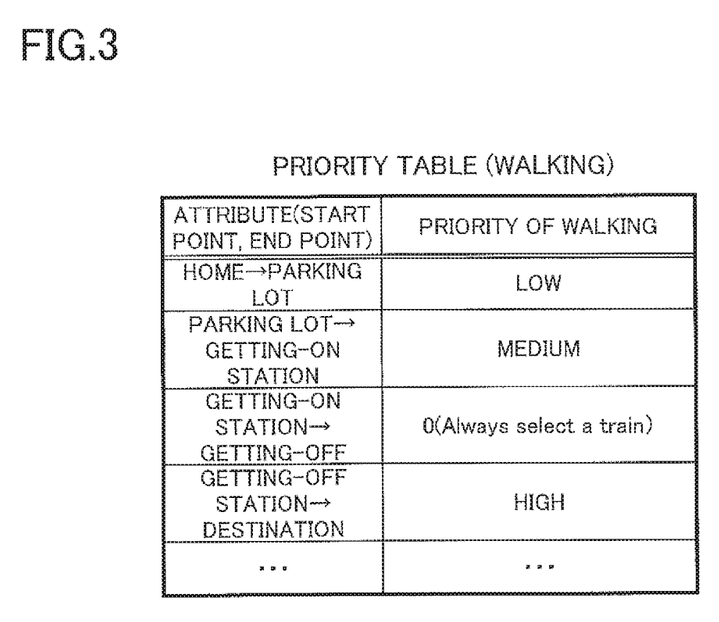
FIG. 3 is a diagram illustrating a priority table in which a priority of walking is set based on the combination of an attribute of a start point and an attribute of an end point in a section.

For example, FIG. 3 is one example of the priority table 12 in which a priority of walking is set based on the combination of an attribute of a start point and an attribute of an end point in a section. In one example illustrated in FIG. 3, the priority of walking is set to "low" in a section from "a home" to "a parking lot". The priority of walking is set to "medium" in a section from "a parking lot" to "a getting-on station". The priority of walking is set to "0 (not selected)" in a section from "a getting-on station" to "a getting-off station". The priority of walking is set to "high" in a section from "a getting-off station" to "a destination". "A getting-on station" and "a getting-off station" can be replaced with "a boarding bus stop" and "an alighting bus stop", "a boarding port" and "an arrival port", or "a boarding airport" and "an arrival airport".

Figure 4:
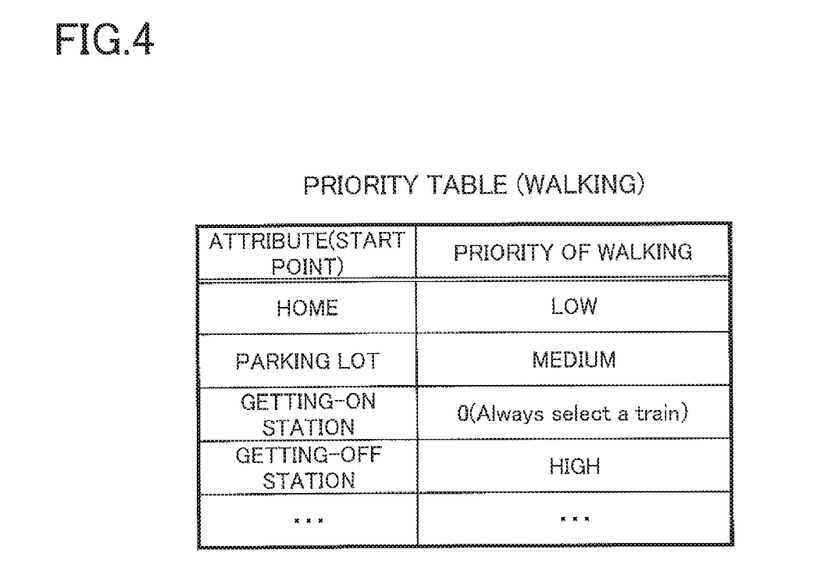
FIG. 4 is a diagram illustrating a priority table in which the priority of walking is set based on the attribute of the start point in the section.

FIG. 4 is one example of the priority table 12 in which the priority of walking is set based on the attribute of the start point in the section as a variation. In one example illustrated in FIG. 4, the priority of walking is set to "low" in a section with "a home" as a start point. The priority of walking is set to "medium" in a section with "a parking lot" as a start point. The priority of walking is set to "0 (not selected)" in a section with "a getting-on station" as a start point". The priority of walking is set to "high" in a section with "a getting-on station" as a start point". In the priority table 12 of FIG. 4, the priority of walking is determined only by the attribute of the start point in the section without the attribute of the end point.

Figure 5:
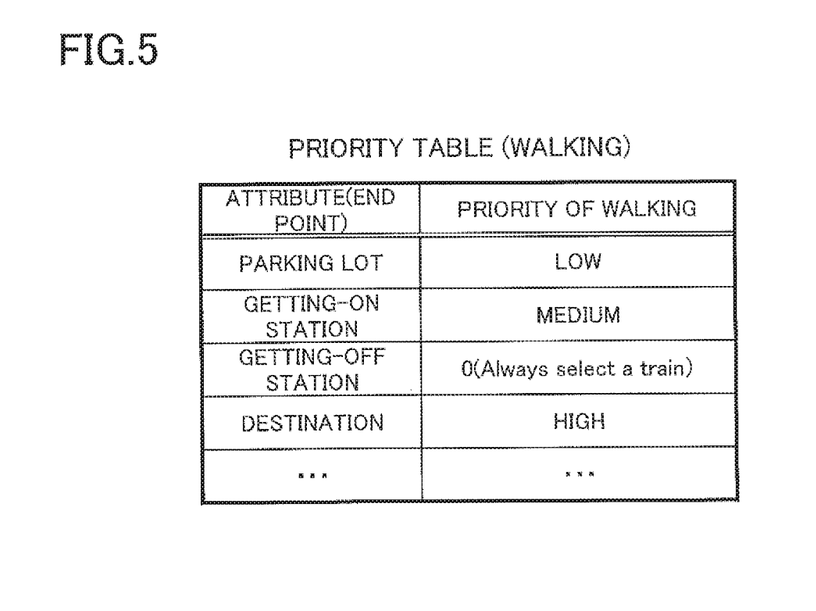
FIG. 5 is a diagram illustrating a priority table in which the priority of walking is set based on the attribute of the end point in the section.

FIG. 5 is one example of the priority table 12 in which the priority of walking is set based on the attribute of the end point in the section as a variation. In one example illustrated in FIG. 5, the priority of walking is set to "low" in a section with "a parking lot" as an end point. The priority of walking is set to "medium" in a section with "a getting-on station" as an end point. The priority of walking is set to "0 (not selected)" in a section with "a getting-off station" as an end point. The priority of walking is set to "high" in a section with "a destination" as an end point. In the priority table 12 of FIG. 5, the priority of walking is determined only by the attribute of the end point in the section without the attribute of the start point.

Although the priority of walking is set using the priority table 12 in the present embodiment, any other transportation means other than walking (private automobiles, trains, buses, ships, and planes etc.) can be set. Also, the priority of the plurality of kinds of transportation means (for example, walking and private automobile) can be set.

The server side map DB13 is a storage means for storing server side map information, i.e. map information of the latest version registered based on input data and input operation from the outside. The server side map information includes various information necessary for a route search, a route guidance, and map display as well as a road network. For example, the server side map information specifically includes a network data including a node and a link indicating a road network, a link data about a road (link), a node data about a note point, an intersection data about each intersection, a point data about points such as a faculty, a map display data for displaying a map, a search data for searching a route, a search data for searching a point etc. Further, the server side map DB 13 also stores various kinds of information (railroad tracks and timetables for trains, bus stops, bus routes, time tables for buses, ship routes, timetables for ship, routes and timetables for planes etc.) for searching routes using the transportation means such as trains, buses, ships, planes. However, this information may be obtained from the outside server.

The server side communication device 14 is a communication device to communicate with the information terminal 5 via the communication network 6. The server side communication device 14 can receive various kinds of traffic information such as traffic congestion information, traffic control information, traffic accident information transmitted from an internet network, a traffic information center, for example, VICS (Registered Trademark: Vehicle Information and Communication System) center etc. other than the information terminal 5.

Figure 6:
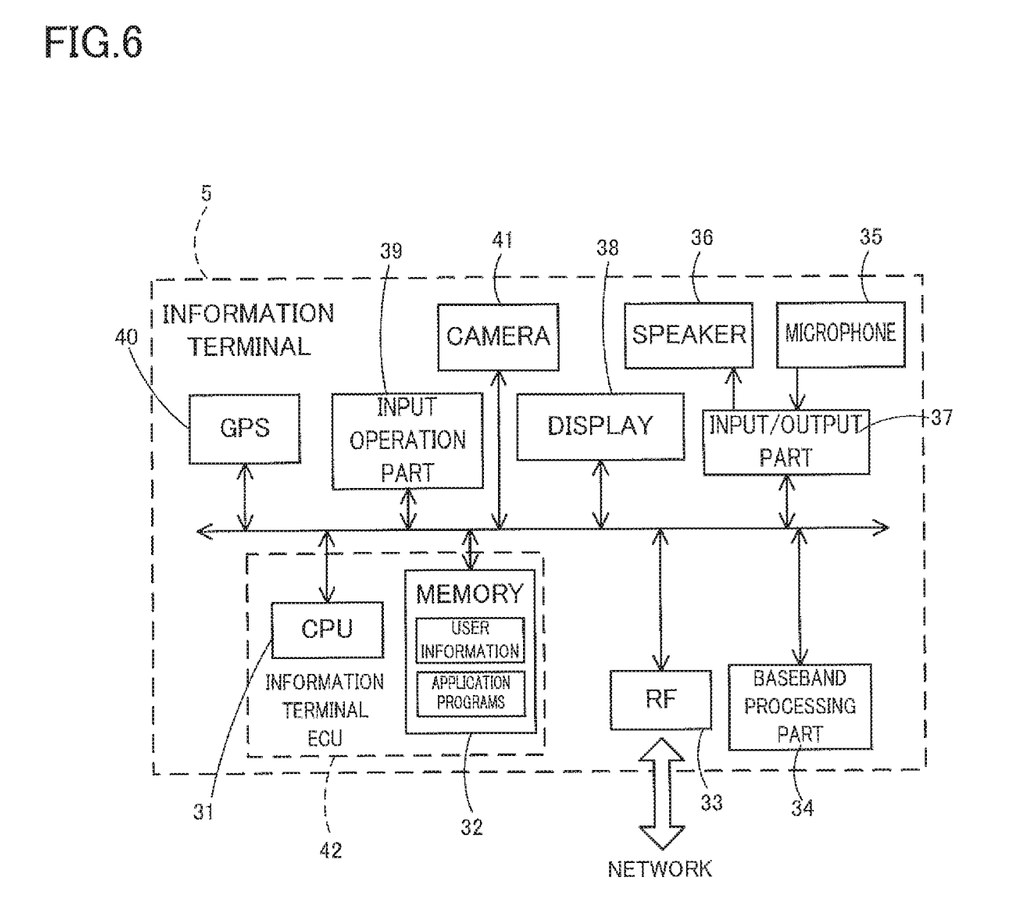
FIG. 6 is a block diagram illustrating a configuration of an information terminal according to the present embodiment.

Next, the schematic configuration of the information terminal 5 will be described with reference to FIG. 6. FIG. 6 is a block diagram schematically illustrating a control system of the information terminal 5 according to the present embodiment. Especially, a case where the information terminal 5 is a smartphone will be described in the below description as an example.

As illustrated in FIG. 6, the information terminal 5 is configured to connect a data bus BUS to a CPU 31, a memory 32 in which user information (a user ID, name etc.) about the user 4 carrying the information terminal 5 is stored, a transmitting/receiving circuit part (RF) 33 to transmit/receive signals to/from the base stations of the communication network 6, a baseband processing part 34 in which a RF (Radio Frequency) signal received at the transmitting/receiving circuit part 33 is converted into a baseband signal, and the baseband signal is converted into the RF signal, an input/output part 37 that is an interface between a microphone 35 and a speaker 36, a display 38 composed of a liquid crystal display panel etc., an input operation part 39 composed of a touch panel and hard button etc., a GPS 40, and a camera 41.

The CPU 31 built in the information terminal 5 is a control means of the information terminal 5 to execute various operations in accordance with an operation program stored in the memory 32, and an information terminal ECU 42 is composed of the CPU 31 and the memory 32. Various processing contents of the information terminal ECU 42 are displayed on the display 38 as necessary.

The memory 32 is a storage medium for storing the user information (user ID and name etc.) about the user 4 carrying the information terminal 5 etc. Various CAMERA including a route search processing program (FIG. 7) described later are also stored in the memory 32. The map information may be stored in the memory 32. The processing of the route search can be executed not by the server device 1 but by the information terminal 5 if the map information is stored in the memory 32. Also, the memory 32 may be composed of a hard disk and a memory card etc.

The display 38 is arranged on one surface of a case, and a liquid crystal display and an organic EL display etc. are used for the display 38. A top screen for executing various applications installed in the information terminal 5, a screen (internet screen and mail screen etc.) related to the executed applications, and various information such as images and moving images are displayed. Also, when the route search is executed, route information for specifying the searched route is also displayed.

The input operation part 39 is composed of the touch panel provided on a front surface of the display 38 and the hard button arranged in the case. The information terminal ECU 42 performs a control to execute corresponding various operations based on an electric signal output by pressing down the touch panel and the hard button. The input operation part 39 can be composed of various keys such as a number/character input key, a cursor key for moving a cursor to select a displayed content, and a determination key to determine the selection.

The GPS 40 can detect the current position of the information terminal 5 (i.e. the user 4) and the current date and time by receiving radio waves generated by an artificial satellite. Any other devices (for example, a gyro sensor etc.) for detecting the current position and the azimuth of the information terminal 5 may be included other than the GPS 40.

The camera 41 is a small imaging device composed of a camera using a solid state imaging device such as CCD and is built in a rear side of the information terminal 5. The camera 41 can image the surroundings when the user operates the input operation part 39 in a state where a dedicated application program is started up. A captured image imaged by the camera 41 is stored in the memory 32.

Figure 7:
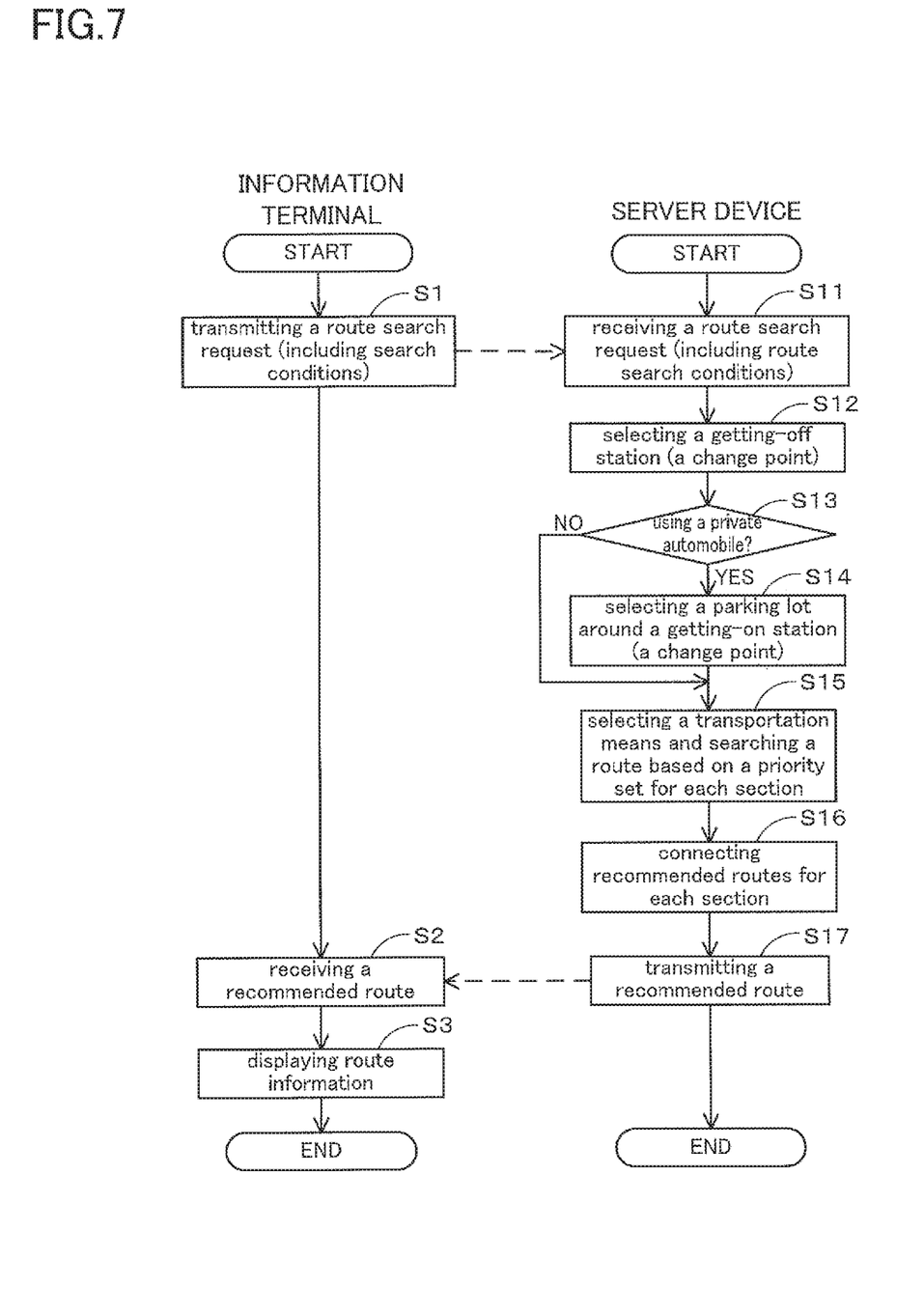
FIG. 7 is a flowchart of a route search processing program according to the present embodiment.

Next, the route search processing program executed in the server device 1 and the information terminal 5 including the above-mentioned technical features will be described based on FIG. 7. FIG. 7 is a flowchart of the route search processing program according to the present embodiment. The route search processing program is a program that is executed after a navigation application is started up in the information terminal 5 and that searches a route to the destination in accordance with the user's operation and provides the route information for specifying the searched route. The program illustrated by a flowchart in FIG. 7 is stored in the memory 32 included in the information terminal 5 or the RAM 22 and the ROM 23 included in the server device 1, and the program is executed by the CPU 31 or the CPU 21.

Firstly, the route search processing program executed in the information terminal 5 will be described. In a step 1 (hereinafter, abbreviated as S), the CPU 31 transmits a route search request to the server device 1. The route search request includes a terminal ID for specifying the information terminal 5 as a transmission source of the route search request, information for specifying a departure place (for example, the current position of the user) and a destination, and route search conditions set in the information terminal 5 as a transmission source at the present time. "The route search conditions" includes whether the user actually uses a private automobile as a transportation means, and whether the user uses a toll road when he/she uses the private automobile. "The route search conditions" can be set in advance by the user's operation on a setting screen displayed in the information terminal 5 (not shown). It is not always necessary to transmit the information for specifying the destination at the time of re-searching.

Next, in a step S2, the CPU 31 receives information about a recommended route from a departure place to a destination (hereinafter, referred to as a center route) searched in the server device 1 in response to a route search request. The center route received at the S2 is a recommended route from a departure place to a destination searched using the map information of the latest version included in the server device 1 based on a route search request transmitted from the information terminal 5. The details about the search for the center route in the server device 1 will be described later.

In the present embodiment, when the center route is searched, the search for the recommended route is executed taking into consideration moving while changing the plurality kinds of transportation means such as walking, private automobiles, trains, buses, ships, and planes (multimodal). Accordingly, the information about the center route transmitted from the server device 1 includes information for specifying a transportation means used for moving at the center route.

Figure 8:
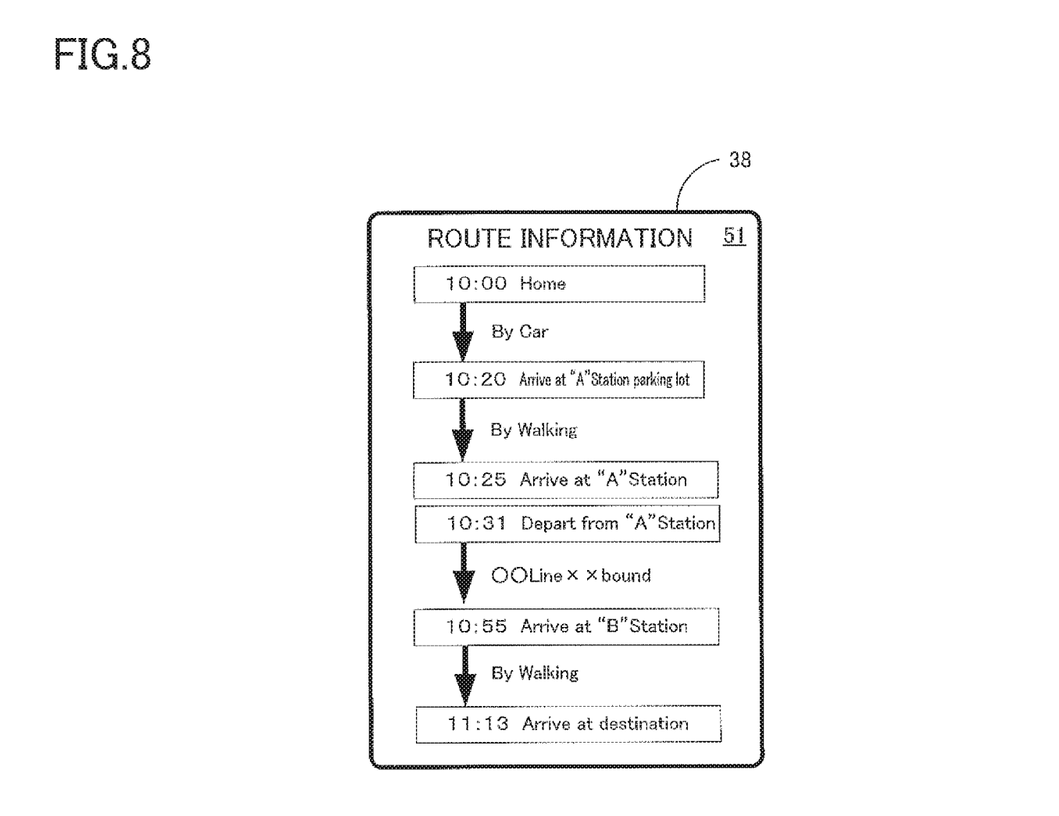
FIG. 8 is a diagram illustrating a display example of route information.

After that, at a S3, the CPU 31 displays the route information for specifying the center route received in the S2 on the display 38. FIG. 8 is a diagram illustrating one example of the route information displayed on the display 38.

As illustrated in FIG. 8, a route guidance screen 51 displays a route in order from a departure place to a destination along with a transportation means and a predicted arrival time in time series as route information for specifying the center route. A user can grasp what kind of transportation means is appropriate to move to the destination by referring to the route guidance screen 51. Also, an image with the center route displayed on a map may be displayed. The user can change the route search conditions again after visually confirming the route information about the center route displayed on the route guidance screen 51.

The CPU 31 can set the center route received from the server device 1 at the S2 as a guidance route used when guiding to the destination. When the center route is set as the guidance route, the guidance to the destination is started based on the set guidance route.

Next, the route search processing program executed in the server device 1 will be described. Firstly, the CPU 21 receives a route search request transmitted from the information terminal 5 at S11. The route search request includes a terminal ID for specifying the information terminal 5 as a transmission source of the route search request, information for specifying a departure place (for example, the current position of the user) and a destination, and route search conditions.

After that, at a S12, the CPU 21 selects a getting-on station and a getting-off station based on the route search request received at the S 11 and the map information included in the server device 1. Basically, a nearest station to a departure station and a nearest station to a destination are selected as a getting-on station and a getting-off station, respectively. Although a case where a train is used as a transportation means will be described in the below description, "a boarding bus stop" and "an alighting bus stop" are selected instead of the getting-on station and the getting-off station when a bus is used as a transportation means. "A boarding port" and "an arrival port" are selected instead of the getting-on station and the getting-off station when a ship is used as a transportation means. "A boarding airport" and "an arrival airport" are selected instead of the getting-on station and the getting-off station when a plane is used as a transportation means.

However, when a distance between the departure place and the destination is short, or when there are no stations around the departure place and the destination, the getting-on station and the getting-off station may not be selected. In this case, a route for moving from the departure place to the destination by walking or a private automobile (only when a private automobile is selected for use as route search conditions) is searched. The getting-on station and the getting-off station selected at the S12 correspond to a change point where a transportation means is changed.

Next, at the S13, the CPU 21 determines whether the user selects a private automobile as a transportation means especially, in route search conditions out of the route search request received at the S11.

When it is determined that the user selects a private automobile as a transportation means (S13: YES), the step is moved to a S14. In contrast, when it is determined that the user does not select a private automobile as a transportation means (S13: NO), the step is moved to a S15.

In the step S14, the CPU 21 searches parking lots around the getting-on station selected at the S 12 based on the map information included in the server device 1. A parking lot as a candidate to be parked by his/her own private automobile is selected from the searched parking lots. The parking lot the most accessible for the user is selected, and the parking lot is selected by comprehensively determining a distance from the getting-on station, a parking charge, a type of the parking lot (plane type, multistory type) etc. The selection may be made so as to let the user select a parking lot after suggesting a plurality of candidates of the parking lots. The parking lot selected at the S14 as well as the getting-on station and the getting-off station selected at the S12 correspond to a change spot at which the transportation means is changed.

Next, at the S15, the CPU 21 divides a distance between the departure place and the destination at the getting-on station, the getting-off station selected at the S 12, and the parking lot selected at the S14, and the priority of the transportation means is set for the each divided section. The priority is set based on at least one of the attribute of the start point and the attribute of the end point in the section and the priority table 12 (FIGS. 3-5). After that, the transportation means is selected and the recommended route is searched based on the priority of the transportation means set for the each section. When the user does not select a private automobile as a transportation means in the route search conditions, the distance between the departure place and the destination is divided at the getting-on station and the getting-off station selected at the S12 since the parking lot is not selected at the S14. For example, FIG. 9 illustrates one example where the user selects his/her private automobile as a transportation means in the route search conditions, and a distance between the start point and the end point is divided into a four sections, i.e. a section L1 from the departure place (home) to the parking lot, a section L2 from the parking lot to the getting-on station, a section L3 from the getting-on station to the getting-off station, and a section LA from the getting-off station to the destination.

One example of setting the priority of the transportation means based on the combination of the attribute of the start point and the attribute of the end point in the each section of L1 to L4 illustrated in FIG. 9 and the priority table 12 in FIG. 3 will be described below.

Figure 9:
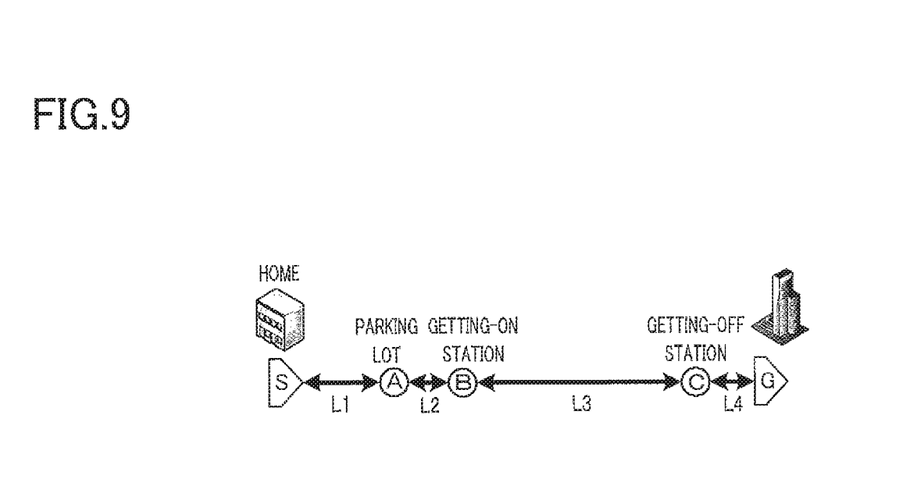
FIG. 9 is a diagram illustrating each section where a route from a departure place to a destination is divided at each change point.

For example, the start point and the end point of the section L1 in FIG. 9 are the home and the parking lot, respectively. Accordingly, the priority of walking in the section L1 is set to "low". In the section where the priority of walking is set to "low", a route for moving by walking is searched in the case of the route length less than 1 km. Namely, when a recommended route for walking within 1 km from the home to the parking lot can be found, walking is selected as a transportation means. In contrast, when the recommended route for walking within 1 km from the home to the parking lot cannot be found, the private automobile is selected as a transportation means. When walking is selected as a transportation means, it is not necessary to go through the parking lot, and thus it is desirable to search the route from the home to the getting-off station excluding the parking lot. The search for the recommended route is executed using a known Dijkstra method, and a route with the total of cost values minimized is a recommended route. The costs are calculated according to a transportation means in the search of the recommended route. For example, while the cost value of a wide road such as a national road and a prefectural road is reduced when a transportation means is a private automobile, the cost value of a road with a sidewalk is reduced when a transportation means is walking.

The start point and the end point of the section L2 in FIG. 9 are the parking lot and the getting-on station, respectively. Accordingly, the priority of walking in the section L2 is set to "medium". In the section where the priority of walking is set to "medium", a route for moving by walking is searched in the case of the route length less than 2 km. Namely, when a recommended route for walking within 2 km from the parking lot to the getting-on station can be found, walking is selected as a transportation means. In contrast, when the recommended route for walking within 2 km from the parking lot to the getting-on station cannot be found, a taxi or a bus is selected as a transportation means. When the bus is selected as a transportation means, "the boarding bus stop" and "the alighting bus stop" are selected as a change point where the transportation means is newly changed, and a route from the parking lot to "the boarding bus stop" and a route from "the alighting bus stop" to the getting-on station are also searched. The search for the recommended route is executed using the known Dijkstra method, and a route with the total of cost values minimized is a recommended route.

The start point and the end point of the section L3 in FIG. 9 are the getting-on station and the getting-off station, respectively. Accordingly, the priority of walking in the section L3 is set to "0 (not selected)". In the section where the priority of walking is set to "0 (not selected)", the transportation means other than walking is always selected. In one example illustrated in FIG. 9, a train is selected as a transportation means to move between two stations, and a route for moving by train is searched. The search for the recommended route is executed using the known Dijkstra method, and a route with the total of cost values minimized is a recommended route.

The start point and the end point of the section L4 in FIG. 9 are the getting-off station and the destination, respectively. Accordingly, the priority of walking in the section L4 is set to "high". In the section where the priority of walking is set to "high", a route for moving by walking is searched in the case of the route length less than 3 km. Namely, when a recommended route for walking within 3 km from the getting-off station to the destination can be found, walking is selected as a transportation means. In contrast, when the recommended route for walking within 3 km from the getting-off station to the destination cannot be found, a taxi or a bus is selected as a transportation means. When the bus is selected as a transportation means, "the boarding bus stop" and "the alighting bus stop" are selected as a change point where the transportation means is newly changed, and a route from the getting-off station to "the boarding bus stop" and a route from "the alighting bus stop" to the destination are also searched. The search for the recommended route is executed using the known Dijkstra method, and a route with the total of cost values minimized is a recommended route.

In the present embodiment, the upper limit distance of the route for moving by walking is changed based on the priority of walking as described above (for example, the upper limit distance in "low", "medium", and "high" priority of walking are 1 km, 2 km, and 3 km, respectively). Thus, in the section where the priority of walking is high, walking is easier to be selected as a transportation means.

In the S16, the CPU 21 connects recommended routes finally searched in each section to each other, making it a recommended route from the departure place to the destination. The recommended route specified in the S16 is temporarily stored in the flash memory 24 etc.

Next, at the S17, the CPU 21 distributes the recommended route specified in the S16 to the information terminal 5 that received a request for the route search. The information for specifying the transportation means for each section is also included. In the information terminal 5 that received the recommended route, the received recommended route is displayed on the display 38 for the user's information as described above (S3).

As described in detail above, since when the route to the destination is searched, in the server device 1 and the computer program executed in the server device 1 according to the present embodiment, the change point at which the transportation means is changed is set (S 12, S 14), and then the priority in selecting a transportation means for moving in the section from a plurality kinds of transportation means is set based on at least one of the attribute of the start point and the attribute of the end point in the section for the each section where the distance between the departure place and the destination is divided at the change point to search the route to the destination using the transportation means selected for each of the plurality of sections based on the set priority (S15, S16), the route where a transportation means more suitable for a user is selected can be searched even when the route for moving while changing the plurality of transportation means is searched.

It should be understood that the present disclosure is not limited to embodiments as described above, and the various changes, substitutions, and alterations could be made hereto without departing from the spirit and scope of the disclosure.

For example, although, in the embodiment, the upper limit distance of the route for moving by walking (for example, the upper limit distance in "low", "medium", and "high" priority of walking are 1 km, 2 km, and 3 km, respectively) is set based on the priority of walking, and walking is selected as a transportation means in the case of less than the upper limit distance, and any other transportation means other than walking (for example, private automobiles, buses, and taxi) is selected in the case of more than the upper limit distance, a transportation means with the lowest cost value may be selected by comparing the total cost value of the recommended route for moving by walking as a transportation means with the total cost value of the recommended route for moving by any other transportation means other than walking for each section. Further, the cost value of walking may be corrected based on the priority of walking in this case. For example, the cost value is corrected into 1.2 times in a section with the "low" priority of walking, 1 times in a section with the "medium" priority of walking, and 0.8 times in a section with the "high" priority of walking. Accordingly, walking can be easier to be selected as a transportation means in a section with the high priority of walking.

Although in the present embodiment, the priority of the corresponding transportation means is set based on at least one of the attribute of the start point and the attribute of the end point at the each section, the priority of the transportation means may be set taking into consideration the characteristics of area including the section. For example, in an area such as an urban area where the public transportation has developed, the priority of walking may be increased or the priority of a private automobile may be decreased in a section with a home as a start point.

The priority of the transportation means may be set taking into consideration the user characteristics. For example, for a user who frequently moves by walking (for example, the average walking distance per day is 5 km or more), the priority of walking may be increased more than the values shown in FIGS. 3 to 5 (for example, the priority of walking is changed from "low" to "medium", or from "medium" to "high"). Meanwhile, for a user who infrequently moves by walking (for example, the average walking distance per day is 3 km or less), the priority of walking may be decreased less than the values shown in FIG. 3 to 5 (for example, the priority of walking is changed from "high" to "medium", or from "medium" to "low").

Although the server device 1 executes the route search processing (S12~S16) in the present embodiment, the information terminal 5 may execute a part or all the route search processings. In this case, the map information is stored in the information terminal 5, and the information terminal 5 executes the route search processing using the stored map information.

Also, although one example where the information terminal 5 is applied to a smart phone is described in the present embodiment, any other type of information terminal can be applied as long as a function for guiding a searched route to a user is included. For example, the information terminal 5 can be applied to a cellular phone, a tablet device, a personal computer, and a navigation device etc.

Although the embodiment of the route search device according to the present disclosure was described above, the route search device may include the following technical features, which will bring out the below effects.

For example, the first aspect of the present disclosure is as follows:

a route search device comprises: priority setting means (e.g., CPU 21) for setting a priority in selecting a transportation means used for moving in a section from a plurality of kinds of the transportation means for each section included in a route when searching a route to a destination; and a route search means (e.g., CPU 21) for searching the route to the destination using the transportation means selected for the each section based on the priority set by the priority setting means, wherein the priority setting means sets the priority of the corresponding transportation means based on at least one of an attribute of a start point and an attribute of an end point in the section for the each section included in the route.

According to the route search device including the above-mentioned technical feature, a route where a transportation means more suitable for a user is selected can be searched by setting a priority of the transportation means based on at least one of an attribute of a start point and an attribute of an end point in each section included in a route to the destination even when a route for moving by changing a plurality kinds of transportation means is searched.

The second aspect of the present disclosure is as follows: the route search device further comprises change point setting means (e.g., CPU 21) for setting a change point at which a transportation means is changed, and the priority setting means sets the priority for each section where a distance between a departure place and a destination is divided at each change point.

According to the route search device including the above-mentioned technical feature, a route where a transportation means more suitable for a user is selected can be searched in each section divided at the change point of the transportation means even when a route for moving by changing a plurality kinds of transportation means is searched.

The third aspect of the present disclosure is as follows: the priority setting means (e.g., CPU 21) sets the priority based on characteristics of area included in a section.

According to the route search device including the above-mentioned technical feature, a route where a more suitable transportation means is selected can be searched taking into consideration the characteristics of the area in the route.

The fourth aspect of the present disclosure is as follows: the route search device further comprises providing means (e.g., CPU 21) for providing a user with the route searched by the route search means (e.g., CPU 21), and the priority setting means (e.g., CPU 21) sets the priority based on user characteristics of the user.

According to the route search device including the above-mentioned technical features, a route where a transportation means more suitable for a user is selected can be searched taking into the user characteristics of the user for whom the route is provided.

The fifth aspect of the present disclosure is as follows: the priority setting means lowers the priority of walking as a transportation means in a section with a start point as a home compared to a section with a start point as a getting-off station or a parking lot.

According to the route search device including the above-mentioned technical features, a route for moving by a transportation means other than walking can be easy to be selected in a situation where the transportation means other than walking is better while a route for moving by walking can be easy to be selected in a situation where walking is better than any other transportation means.

The sixth aspect of the present disclosure is as follows: the route search means (e.g., CPU 21) searches a route for moving by walking in a case where a route length does not exceed a first upper limit value in a section where the priority of walking as a transportation means is less than a threshold value, the route search means (e.g., CPU 21) searches a route for moving by walking in a case where the route length does not exceed a second upper limit value longer than the first upper limit value in a section where the priority of walking as a transportation means is a threshold value or more.

According to the route search device including the above-mentioned technical features, walking can be easier to be selected as a transportation means in a section where the priority of walking is high.

What is claimed is:

1. A route search device comprising:
an electronic control unit comprising a central processing unit and a memory, wherein the electronic control unit is configured to:
   receive, through a communication device from an information terminal, a route search request;
   set a priority in selecting a transportation means used for moving in a section of a route defined by a plurality of sections from a plurality of kinds of the transportation means for each section included in the route when searching a route to a destination based on the route search request;
   search the route to the destination using one or more of the plurality of kinds of the transportation means and select a transportation means for the each section based on the set priority for the transportation means, wherein:
      at least one section of the route is searched for moving by a first transportation means of the plurality of kinds of transportation means when a route length does not exceed a first upper limit value and the priority of the first transportation means for the at least one section of the route is less than a threshold value, the priority is based on a physical location associated with the at least one section of the route, and
      at least one section of the route is searched for moving by the first transportation means when the route length does not exceed a second upper limit value longer than the first upper limit value and the priority of the first transportation means for the at least one section of the route is the threshold value or more, the priority is based on the physical location associated with the at least one section of the route and wherein a recommended route is defined for each section based on the selected transportation means;
   connect each recommended route, defined by the selected transportation means, for each section forming a final recommended route from a departure place to the destination; and
   provide, to a user via the communication device, a route information specifying the final recommended route,
   wherein setting the priority of corresponding transportation means is based on the route search request comprising at least one of a physical location of a start point and a physical location of an end point for each section included in the route.

2. The route search device according to claim 1 wherein the electronic control unit is further configured to: set a change point at which the transportation means is changed, and
   the electronic control unit is configured to set the priority for each section where a distance between a departure place and a destination is divided at each change point.

3. The route search device according to claim 1, wherein the priority is set based on characteristics of area included in the section of the route.

4. The route search device according to claim 1 wherein the electronic control unit is further configured to: provide a user with the route searched, and set the priority based on user characteristics of the user.

5. The route search device according to claim 1, wherein the electronic control unit is further configured to lower the priority of walking as the transportation means in a section of the route with a start point as a home compared to a section of the route with a start point as a getting-off station or a parking lot.

6. The route search device according to claim 1, wherein the first transportation is moving by walking.

7. A non-transitory computer-readable medium storing a program, when executed, causes a computer comprising a central processing unit and a memory to:
receive, through a communication device from an information terminal, a route search request;
set a priority in selecting a transportation means used for moving in a section for each section included in a route from a plurality of kinds of the transportation means when searching a route to a destination based on the route search request;
search the route to the destination using one or more of the plurality of kinds of the transportation means and select a transportation means for the each section of the route based on the set priority for the transportation means, wherein:
at least one section of the route is searched for moving by a first transportation means of the plurality of kinds of transportation means when a route length does not exceed a first upper limit value and the priority of the first transportation means for the at least one section of the route is less than a threshold value, the priority is based on a physical location associated with the at least one section of the route, and
at least one section of the route is searched for moving by the first transportation means when the route length does not exceed a second upper limit value longer than the first upper limit value and the priority of the first transportation means for the at least one section of the route is the threshold value or more, the priority is based on the physical location associated with the at least one section of the route, and-wherein a recommended route is defined for each section based on the selected transportation means;
connect each recommended route, defined by the selected transportation means, for each section forming a final recommended route from a departure place to the destination; and
provide, to a user via the communication device, a route information specifying the final recommended route,
wherein setting the priority of corresponding transportation means is based on the route search request comprising at least one of a physical location of a start point and a physical location of an end point for each section included in the route.

* * * * *